United States Patent
Perry et al.

(10) Patent No.: US 7,244,366 B2
(45) Date of Patent: Jul. 17, 2007

(54) WATER FILTRATION AND RECYCLING FOR STONE FABRICATION EQUIPMENT FOR EXTERIOR AND ARCHITECTURAL STONE

(75) Inventors: Ross E. Perry, Exeter, NH (US); Paula K. Perry, Exeter, NH (US)

(73) Assignee: Stone Industry Recycling, Inc., Hampton, NH (US)

( * ) Notice: Subject to any disclaimer, the term of this patent is extended or adjusted under 35 U.S.C. 154(b) by 127 days.

(21) Appl. No.: 11/098,215

(22) Filed: Apr. 4, 2005

(65) Prior Publication Data

US 2005/0167371 A1 Aug. 4, 2005

Related U.S. Application Data

(63) Continuation-in-part of application No. 10/650,187, filed on Aug. 28, 2003, now Pat. No. 6,896,818.

(51) Int. Cl.
*B01D 25/12* (2006.01)
*B01D 37/02* (2006.01)

(52) U.S. Cl. ............... 210/777; 210/791; 210/805; 210/167; 210/224; 210/351

(58) Field of Classification Search ............ 210/777, 210/791, 805, 194, 195.1, 167, 224, 351, 210/251, 416.1, 488; 451/65
See application file for complete search history.

(56) References Cited

U.S. PATENT DOCUMENTS

| | | | |
|---|---|---|---|
| 2,594,518 A | 4/1952 | Teale | |
| 4,597,868 A | 7/1986 | Watanabe | |
| 5,013,461 A | 5/1991 | Drori | |
| 5,106,493 A | 4/1992 | McIntosh | |
| 5,409,616 A | 4/1995 | Garbutt et al. | |
| 5,447,642 A | 9/1995 | Schenach | |
| 6,428,709 B1 | 8/2002 | Tsuihiji et al. | |

FOREIGN PATENT DOCUMENTS

| | | |
|---|---|---|
| JP | 06-170835 A | 6/1994 |
| JP | 08/197726 A | 7/1996 |
| WO | WO200162362 A1 | 8/2001 |

OTHER PUBLICATIONS

Proposal to Butch Shea by Compliance Systems, Inc., Proposal No. 40162002, Apr. 16, 2002, pp. 1-8.
Proposal to Aki Vourakis by Compliance Systems, Inc., Proposal No. 7022002, Jul. 16, 2002, pp. 1-9.

*Primary Examiner*—Frank M. Lawrence
(74) *Attorney, Agent, or Firm*—Quarles & Brady LLP

(57) ABSTRACT

A filtered grey water recycling system includes a waste water storage tank for receiving waste water from a stone processing system and a filtered grey water supply loop providing filtered grey water to the stone processing system. The filtered grey water loop includes a separation filter for removing large particulate waste from the grey water and a particle filter for filtering smaller particulate matter. The separation filter discharges the large particulate waste into the waste water storage tank and a clear water filter loop filters waste water from the waste water storage tank through a high pressure filter and discharges the resulting clear water into the waste water storage tank.

19 Claims, 6 Drawing Sheets

WATER FILTRATION AND RECYCLING FOR STONE FABRICATION EQUIPMENT FOR EXTERIOR AND ARCHITECTURAL STONE

CROSS REFERENCES TO RELATED APPLICATIONS

The present Patent application is a continuation-in-part of and claims benefit of U.S. patent application Ser. No. 10/650,187 filed Aug. 28, 2003, now U.S. Pat. No. 6,896,818 by Ross E. Perry and Paula K. Perry for WATER FILTRATION AND RECYCLING FOR STONE FABRICATION EQUIPMENT.

FIELD OF THE INVENTION

The present invention is directed to a method and system for water treatment and, in particular, to a method and system for filtering particulate matter from a waste water slurry to provide reusable filtered grey water and, if desired, particulate free "crystal clear" water for processes having differing requirements and, in particular, for stone cutting and polishing processes and including the elimination of any waste water discharge to an on siteseptic facility or a privately owned treatment works (POTW) or a city sewer.

BACKGROUND OF THE INVENTION

Water is employed in a wide range of industrial processes and for a wide range of purposes, each of which imposes its own requirements or characteristics on the properties of the water entering and discharged by the process. Such requirements on the properties or characteristics of water used in or discharges from various processes in turn often result in water treatment processes necessary to make the water suitable or acceptable for use in or discharge from the process, and the various water treatment processes in themselves may be a major technical or economic component of an industrial process.

Various industrial processes can impose a number of chemical and physical requirements on incoming water, such as acidity, salinity, temperature and so on, and corresponding requirements on discharge water, typically to meet environmental or health requirements. In many commonly found industrial processes, however, the principle requirements for input and discharge water concern the particulate or suspended contents of the water rather than, for example, the chemical or dissolved contents of the water.

Examples of processes in which the physical or mechanical contents of the intake and discharge water are the primary concern are found in the stone fabrication industry, such as those involved in cutting, shaping and polishing natural and man-made stone for such products as countertops, flooring, architectural paneling, and so on. As is well known by those of ordinary skill in these arts, water is commonly used to wash away the particulate waste material from the cutting and polishing processes, as a coolant to carry off heat produced by the processes, and often as a lubricant. As a consequence, stone cutting and polishing processes, whether of natural stone or man-made stone-like materials, generate heat and significant volumes of particulate waste material, both of which are carried away in and by the process discharge water. The discharge water is consequently referred to as "grey" water, because of the particulate waste material in the water. The particulate water material is primarily comprised of the material being cut or polished, but will often include other particulate material, such as particles from the cutting and polishing tools themselves and polishing or cutting compounds used with the tools and processes.

The type and degree of treatment performed on the grey discharge water from the processes depends, in turn, on what is done with the discharge water. For example, the grey water is eventually discharged from the processes and the treatment of the grey water before final discharge may be dictated by environmental or health factors. In some instances, the grey water may be treated in no more than a "settling tank" to allow at least some of the particulate waste to "settle out" as sediment before the water is returned, for example, to a river or discharged to enter the groundwater. In addition, water discharged into rivers, streams, groundwater and so on is required to meet state and federal requirements, which typically require ongoing random testing of the discharged water. In most instances, environmental or health concerns may require removal of the particulate waste to the level of "crystal clear" water, as discussed below, before it is returned to the environment or original source.

In still other instances, at least some of the grey water may be recycled to the processes as intake water, thereby reducing to total water volume requirements of the processes. The treatment of recycled grey water will depend, however, upon the uses to which the grey water is to be put. For example, certain processes, and in particular stone cutting, drilling and cooling processes, may use grey water containing a significant amount of particulate waste as the particulate waste from a previous cycle through a stone cutting or polishing and Computer Numeric Controlled (CNC) process will not adversely effect a cutting, drilling, cooling or coarse grinding process. In such instances, the recycled grey water may require no more than a settling tank to allow sedimentation of enough of the particulate waste material that the remaining waste material does not "clog" the ensuing process in which it is used, or may require no treatment at all.

In other instances, however, the process or processes receiving recycled water require "crystal clear" water, that is, water in which the volume and size of particulate matter is strictly limited. Stone polishing and CNC processes, for example, must use intake water that is "crystal clear", that is, water that generally contains no particulate matter, except particles that are generally less than 2 microns in diameter, as larger particulate matter will interfere with the polishing or CNC process by making and leaving scratches that will prevent the desired degree of polish or finish, that may leave visible scratches and that may clog the polishing tools and CNC spindle.

The recycling of grey water into "crystal clear" water, however, is a technically and economically more complex and expensive process than a sedimentation tank as used to recycle grey discharged water to grey intake water for such processes as cutting, drilling, cooling and coarse grinding, and the choice is subject to many factors. For example, it may be less expensive to provide fresh intake water for those processes requiring "crystal clear" water, and to treat all discharge water as grey water for both discharge and recycling purposes. In the alternative, however, and very often, the required quantities of fresh intake water, or intake water of sufficient quality, may not be available or may be more costly than cleaning and recycling grey water into crystal clear water, or the volume of grey water that may be discharged may be limited for any of a number of reasons.

The problem, therefore, is to provide an environmental water discharge system for industrial processes such as stone cutting, grinding, cooling, polishing and for CNC equipments that reduces the required volume of fresh intake water and eliminates all grey discharge water by economic and efficient recycling of grey water into crystal clear water in the required quantities.

The present invention addresses and provides a solution for these and other related problems of the prior art.

SUMMARY OF THE INVENTION

The present invention is directed to a water treatment and recycling system and a method for water treatment and recycling for providing filtered grey water or filtered gray water and clear water to a stone processing system.

According to the present invention, the recycling system includes a waste water storage tank for receiving and storing waste water from the stone processing system and a filtered grey water supply loop that includes a grey water pump for pumping waste water from the waste water storage tank as grey water and a filtered grey water filter path having a separation filter for removing large particulate waste from the grey water. The separation filter has a filtered grey water output providing filtered grey water to the stone processing system and discharges the large particulate waste into the waste water storage tank. The system also includes a clear water filter loop that filters waste water from the waste water storage tank through a high pressure filter and discharges the resulting clear water into the waste water storage tank, thereby for reducing particulate matter in the waste water storage tank by filtering particulate matter from the waste water. The grey water filter path may also include a particle filter for filtering smaller particulate matter from the filtered grey water.

The stone processing system may also include a clear water supply loop wherein waste water from clear water equipment is discharged into the waste water storage tank, with clear water being provided to the clear water equipment from a clear water storage tank that receives clear water from the high pressure filter.

Also according to the present invention, the high pressure filter includes a frame holding a filter stack including a head plate, a plurality of filter plates, an tail plate and a ram for applying axial pressure along the filter stack to force the head plate, the filter plates and the tail plate into a pressure tight assembly with the tail plate being located at the opposite end of the filter stack from the head plate and terminating the input passage and the discharge passages. The head plate and each of the filter plates include an axial input bore connecting sequentially along the filter stage to form an axial input passage for receiving waste water from the waste water storage tank, and a plurality of discharge bores located circumferentially around the axial input passage to form a corresponding plurality of discharge passages extending along the length of the filter stack, the discharge passages being connected to one another outside of the head plate and to the crystal clear water storage tank. Each of the filter plates may further include at least one filter chamber for containing and supporting active filter elements wherein each filter chamber is connected between the axial input passage and each of the plurality of discharge passages. The active filter elements remove particulate matter from the waste water flowing along the input passage to provide the crystal clear water discharged through the discharge passages.

The active filter elements include a filter media extending across a filter chamber in a flow path between the input passage and the discharge passages communicating with the filter chamber and a granular filter layer coated upon and supported by the filter media for removal of particulate matter from the waste water, and the granular filter layer is located in the flow path from the input passage to the discharge passages on the input passage side of the filter media.

Each filter plate includes a filter chamber gasket circumferentially surrounding at least one filter chamber to seal the at least one filter chamber to a next sequential one of a filter plate, the head plate and the tail plate, and a discharge bore gasket circumferentially surrounding each discharge bore on one face of the filter plate to seal each discharge bore to a next sequential one of a filter plate, the head plate and the tail plate.

BRIEF DESCRIPTION OF THE DRAWINGS

The foregoing and other objects, features and advantages of the present invention will be apparent from the following description of the invention and embodiments thereof, as illustrated in the accompanying figures, wherein.

DETAILED DESCRIPTION OF THE INVENTION

Figure 1:
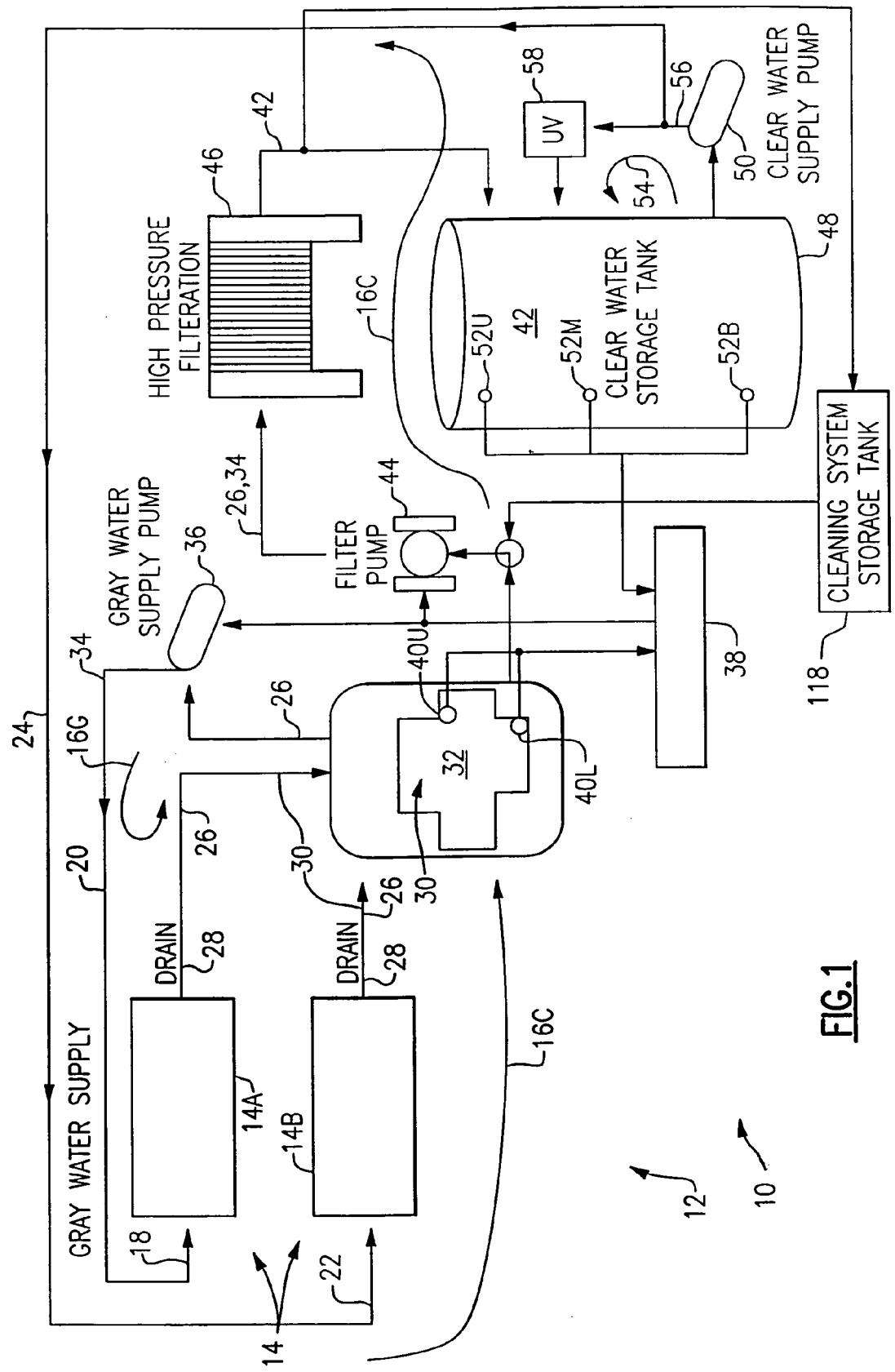
FIG. 1 is a diagrammatic representation of a water processing system of the present invention in association with a stone processing system.

Referring to FIG. 1, therein is shown a diagrammatic representation of a Water Treatment And Recycling System 10 of the present invention in association with a Stone Processing System 12 that includes Stone Processing Tools 14, which will typically include Stone Processing Tools 14A, such as bridge and gantry saws, routers, coarse grinders and cooling functions, that may utilize "grey water" and Stone Processing Tools 14B, such as hand polishers, surface polishers, edge profilers, edge polishers, water jets and CNC Equipment that may require "Crystal Clear Water".

In this regard, and for purposes of the present discussions and invention, "grey water" may be defined as water containing particulate matter that is typically greater than 2 microns in diameter, and that is often significantly larger than 2 microns in diameter, while "crystal clear water" may be defined as water than typically includes only particulate matter less than or equal to 2 microns in diameter.

As shown in FIG. 1, therefore, and according to the present invention, a Water Treatment And Recycling System 10 includes a Grey Water Loop 16G and a Crystal Clear Water Loop 16C, each providing the quality of water required for a given stone processing tool. For this purpose, and as indicated, the Grey Water Intakes 18 of Stone Processing Tools 14A, which can function with grey water, are connected from Grey Water Supply Line 20 of Grey Water Loop 16G while the Crystal Clear Water Intakes 22 of Stone Processing Tools 14B, which require crystal clear water, are connected from Crystal Clear Water Supply Line 24 of Crystal Clear Water Loop 16C.

As may be seen from FIG. 1, Grey Water Loop 16G and Crystal Clear Water Loop 16C share a common waste water discharge path from Stone Processing Tools 14A wherein Waste Water 26 from Waste Water Discharges 28 of Stone Processing Tools 14A and 14B are collected by Waste Water Collection Line 30, which in turn discharges Waste Water 26 into Waste Water Collection Tank 32. Waste Water Collection Tank 32 may be, for example, a pit or a conventional tank, and is a holding reservoir for Waste Water 30 that is to be recycled as grey or crystal clear water. Waste Water Collection Tank 32 may also be a sedimentation facility for the recycling of Waste Water 26 into grey water and crystal clear water, if necessary.

First considering Grey Water Loop 16G, as shown Waste Water 26 is drawn from Waste Water Collection Tank 32 and is pumped onto Grey Water Supply Line 20 as Grey Water 34 by Grey Water Pump 36. In a present embodiment of Water Treatment And Recycling System 10 Grey Water Pump 36 is, for example, a self-priming, electrically powered centrifugal pump delivering Grey Water 34 at, for example, 40 psi and at the volume required by Stone Processing Tools 14A, which will depend upon the specific Stone Processing System 12. As indicated, Grey Water 34 from Grey Water Pump 36 is delivered through Grey Water Supply Line 20 to Grey Water Intakes 18 of Stone Processing Tools 14A, as described above.

As shown, Grey Water Pump 36 is controlled from a conventional Control Panel 38 having the necessary and convention associated control circuits for controlling the operation of Grey Water Pump 36 and the delivery of Grey Water 34 to Stone Processing Tools 14A. For example, the control circuits associated with Grey Water Pump 36 will include a conventional Waste Water Float Sensor/Switch 40 to control the operation of Grey Water Pump 36 dependent upon the level of Waste Water 26 in Waste Water Collection Tank 32.

In particular, Waste Water Float Sensor/Switch 40 prevents Grey Water Pump 36 from operating if the level of Waste Water 26 in Waste Water Collection Tank 32 falls below a preset limit. This grey water cutoff limit is typically determined by the height of the Grey Water Pump 36 intake in Waste Water Collection Tank 32 and is chosen to prevent damage to Grey Water Pump 36 if the level of Waste Water 26 should fall below the level of the Grey Water Pump 36 intake.

Also, when Grey Water Loop 16G is turned on, that is, Grey Water Pump 36 is turned on and enabled by Waste Water Float Sensor/Switch 40, Grey Water Pump 36 will run continuously to maintain the desired pressure in Grey Water Supply Line 20. The continuous operation of Grey Water Pump 36 also insures a continuous flow and recirculation of Grey Water 34 through Waste Water Collection Tank 32 to thereby insure that Waste Water Tank 32 is free from collecting sediments. A manifold or valve may also be connected from the base of Waste Water Collection Tank 32 to allow Waste Water 26 and any sediments accumulated in the base of Waste Water Collection Tank 32 to be flushed from Waste Water Collection Tank 32. The flow of Grey Water 34 is then controlled for each Stone Processing Tool 14A individually by tool water supply control valves associated with the Grey Water Intakes 18 of the individual Stone Processing Tools 14A. Keeping Waste Water Collection Tank 32 free of accumulated sediment thereby also protects Grey Water Pump 36 from "dead heading" in the event that control valves providing Grey Water 34 to Stone Processing Tools 14A are closed.

Crystal Clear Water Loop 16C, like Grey Water Loop 16G, starts at Waste Water Collection Tank 32 where Waste Water 26 that is to be recycled into Crystal Clear Water 42 is drawn from Waste Water Collection Tank 32 by Air Diaphragm Pump 44 and is provided under pressure to High Pressure Filter 46. High Pressure Filter 46, which is described further below, removes from the Waste Water 26 all particulate matter that is 2 microns or greater in diameter, thereby recycling Waste Water 26 into Crystal Clear Water 42, and delivers the Crystal Clear Water 42 into a Crystal Clear Water Storage Tank 48.

In a present embodiment of a Water Treatment And Recycling System 10, Air Diaphragm Pump 44 is driven by air supplied, for example, at a maximum volume of up to 100 scfm and at a maximum pressure of up to 100 psi. The compressed air must be clean, dry air and it will be recognized that the volume and pressure of the air is dependent upon the desired volume of crystal clear water and the resistance offered by High Pressure Filter 46. It will be understood by those of ordinary skill in the relevant arts that the requirements for Air Diaphragm Pump 44 and the air required to drive the pump will thereby be dependent upon the crystal clear water volume requirements of Stone Processing System 12 and that these requirements will vary depending, for example, on the current state and efficiency of High Pressure Filter 46, such as the degree to which the filters therein are clogged by filtered particulate matter. For example, and continuing with the example just described, High Pressure Filter 46 will present approximately 5 psi of backpressure when the filtering apparatus is clean and Air Diaphragm Pump 44 will consume approximately 5 scfm of compressed air. When the filter apparatus in High Pressure Filter 46 is effectively full of particulate matter, High Pressure Filter 46 will present, for example, approximately 80 psi of backpressure and Air Diaphragm Pump 44 will consume approximately 100 scfm of compressed air.

In a present embodiment, Air Diaphragm Pump 44 is controlled from Control Panel 38 and is enabled or disenabled by, for example, Waste Water Float Sensor/Switches 40U and 40L in Waste Water Collection Tank 32, which detects when the level of Waste Water 34 is adequate to supply Crystal Clear Water Storage Tank 48 through Air Diaphragm Pump 44 and when the level of Waste Water 34 in Waste Water Collection Tank 32 has fallen too low, thereby protecting Air Diaphragm Pump 44. In the instance that Waste Water Float Sensor/Switches 40U and 40L float in Waste Water Collection Tank 32, which may be the case when, for example, Waste Water Collection Tank 32 is a pit, Waste Water Float Sensor/Switches 40U and 40L will control only Grey Water Pump 36. Other float sensors in Crystal Clear Water Storage Tank 48, as described below, operate to maintain the necessary flow of water through High Pressure Filter 46 and the necessary levels in Crystal Clear Water Storage Tank 48.

The Crystal Clear Water 42 contained in Crystal Clear Water Storage Tank 48 is drawn from Crystal Clear Water Storage Tank 48 and delivered to Stone Processing Tools 14B through Crystal Clear Water Supply Line 24 by a Crystal Clear Water Supply Pump 50. As in the case of Grey Water Pump 36 and Grey Water Supply Line 20, Crystal Clear Water Supply Pump 50 runs continuously to maintain a desired pressure in Crystal Clear Water Supply Line 24 so long as Crystal Clear Water Supply Pump 50 is turned on from Control Panel 38 and is enabled by float sensors in Crystal Clear Water Storage Tank 48. The flow of Crystal Clear Water 42 to the individual Stone Processing Tools 14B is then controlled by individual crystal clear water control valves located at the Crystal Clear Water Intakes 22 of the individual Stone Processing Tools 14B.

As indicated in FIG. 1, Crystal Clear Water Storage Tank 48 and the control circuits for Crystal Clear Water Supply Pump 50 include a Bottom Float Sensor/Switch 52B, a Middle Float Sensor/Switch 52M and an Upper Float Sensor/Switch 52U, each of which senses and indicates a level or level range of the Crystal Clear Water 42 in Crystal Clear Water Storage Tank 48. For example, Bottom Float Sensor/Switch 52B is located towards the bottom of Crystal Clear Water Storage Tank 48 and functions as a safety switch to protect Crystal Clear Water Supply Pump 50 by insuring that Crystal Clear Water Supply Pump 50 is enabled only when the level of Crystal Clear Water 42 in Crystal Clear Water Storage Tank 48 is at or above the water intake of Crystal Clear Water Supply Pump 50. Upper Float Sensor/Switch 52U, in turn, is located toward the top of Crystal Clear Water Storage Tank 48 and operates to prevent overfilling of Crystal Clear Water Storage Tank 48. Upper Float Sensor/Switch 52U indicates when the Crystal Clear Water Storage Tank 48 is full to maximum safe capacity and turns off Air Diaphragm Pump 44 when this state is reached so that no more Crystal Clear Water 42 is supplied to Crystal Clear Water Storage Tank 48 until the level of Crystal Clear Water 42 therein has decreased below the trip level of Upper Float Sensor/Switch 52U, typically by a flow of Crystal Clear Water 42 to Stone Processing Tools 14B.

Finally, in a present embodiment of a Water Treatment And Recycling System 10 the normal operating range of the level of Crystal Clear Water 42 in Crystal Clear Water Storage Tank 48 is between Upper Float Sensor/Switch 52U and Middle Float Sensor/Switch 52, that is, in the mid-levels of Crystal Clear Water Storage Tank 48 between Upper Float Sensor/Switch 52U and Bottom Float Sensor/Switch 52B. A Middle Float Sensor/Switch 52M is located in these levels to indicate when the level of Crystal Clear Water 42 in Crystal Clear Water Storage Tank 48 is in the normal operating range, which in the present implementation is between Middle Float Sensor/Switch 52M and Upper Float Sensor/Switch 52U. If the level of Crystal Clear Water 42 should fall below the level of Middle Float Sensor/Switch 52M, Middle Float Sensor/Switch 52M will indicate this condition, thus indicating that the operating levels of Crystal Clear Water Storage Tank 48 are falling outside the normal operating range and should be checked and the system adjusted. Middle Float Sensor/Switch 52M thereby provides a visual warning system of a possible undesirable operating trend, that is, that Crystal Clear Water 42 is being used faster than it is being provided from High Pressure Filter 46. Middle Float Sensor/Switch 52M does so by generating a visual and audible warning signal before the output of Crystal Clear Water 42 to Crystal Clear Water Supply Line 24 is cut off when the level of Crystal Clear Water 42 in Crystal Clear Water Storage Tank 48 drops to the point where Bottom Float Sensor/Switch 52B is triggered.

Lastly with regard to Crystal Clear Water Storage Tank 48, it is shown in FIG. 1 that a present embodiment of Crystal Clear Water Loop 16C includes an alternative Sterilization Loop 54 connected from the Crystal Clear Water Output 56 of Crystal Clear Water Supply Pump 50 and through a Sterilizer 58 and back into Crystal Clear Water Storage Tank 48. In the present embodiment of Water Treatment And Recycling System 10, Sterilizer 58 is an ultraviolet disinfection (UV) light that operates to destroy any bacteria that may grow in and contaminate the Crystal Clear Water 42 residing in Crystal Clear Water Storage Tank 48. Because Crystal Clear Water Supply Pump 50 operates continuously to maintain the desired pressure in Crystal Clear Water Supply Line 24 so long as it is enabled by Float Sensor/Switch 52B, as described above, there will be a continuous flow of Crystal Clear Water 42 from Crystal Clear Water Storage Tank 48, through Sterilization Loop 54 and back into Crystal Clear Water Storage Tank 48, thereby continuously disinfecting the Crystal Clear Water 42 therein. Sterilization Loop 54, by running continuously, also provides an escape or relief path for Crystal Clear Water Supply Pump 50 should Crystal Clear Water Loop 16C become "dead headed", such as by the closing of all control valves supplying Stone Processing Tools 14B.

Figure 2:
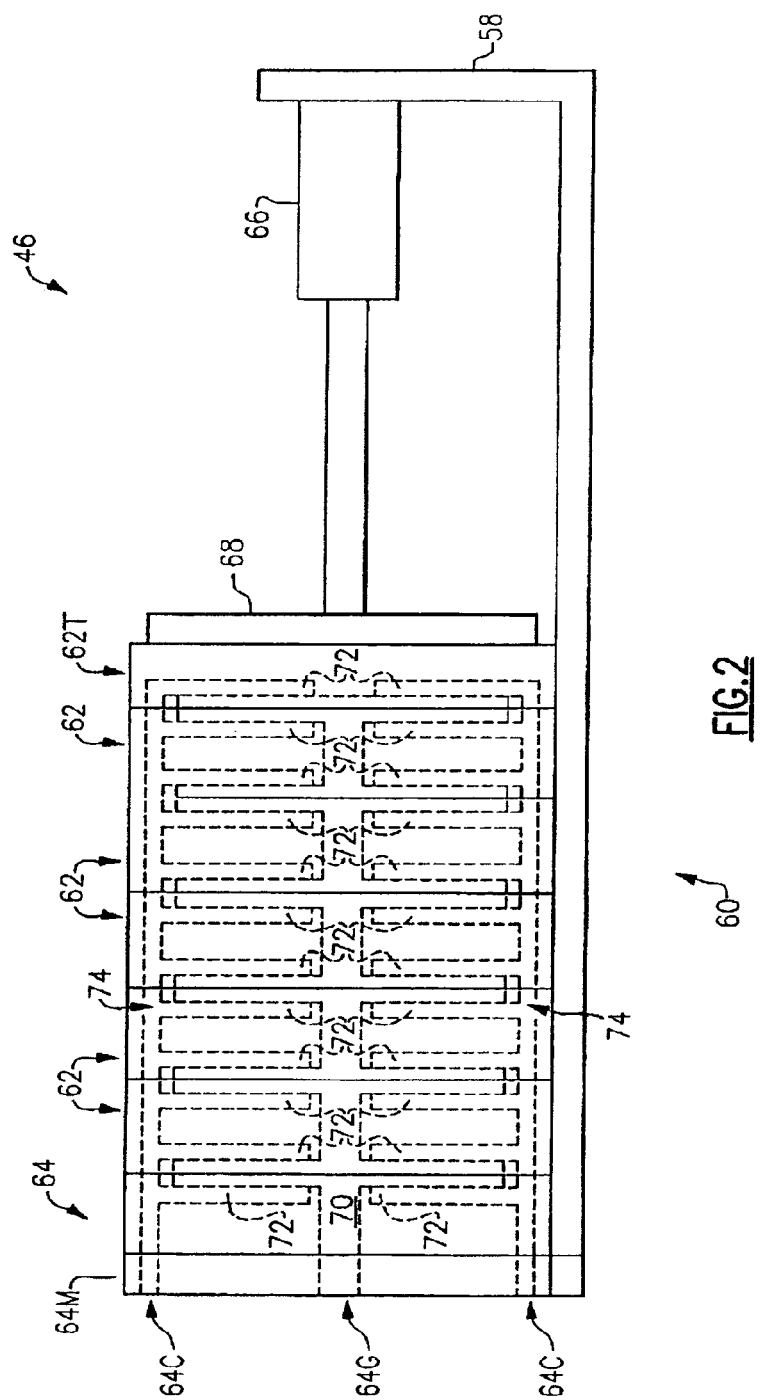
FIG. 2 is a diagrammatic representation of a high pressure filter of the present invention for filtering waste water into clear water.

Referring now to FIG. 2, therein is shown a diagrammatic representation of a High Pressure Filter 46. As illustrated therein, and in addition to Air Diaphragm Pump 44, High Pressure Filter 46 includes a Frame 58 holding a Filter Stack 60 comprised of a steel Frame 58 with plumbing mounted to it, a Manifold Plate 64M, a Head Plate 64, a plurality of Filter Plates 62, and a Tail Plate 62T mounted on Frame 58. A Filter Stack 60 includes a Waste Water Input Port 64G through which Waste Water 26 enters Filter Stack 60 and a plurality of Crystal Clear Water Discharge Ports 64C through which Crystal Clear Water 42 is discharged from Filter Stack 60. A Hydraulic Ram 66 mounted to the Frame 58 controllably exerts axial pressure on a Push Plate 68, which in turn exerts axial force on Tail Plate 62T, the Filter Plates 62 and the Head Plate 46 to force Head Plate 64, Filter Plates 62 and Tail Plate 62T into a water and pressure tight Filter Stack 60 against steel Manifold Plate 64M, to which the Waste Water 26 and Crystal Clear Water 42 connections are made.

As illustrated schematically in FIG. 2, and as described further below, Manifold Plate 64M, Head Plate 64 and Filter Plates 62 are constructed to form a central Input Passage 70 axially interconnecting a plurality of Filter Chambers 72 and forming a Waste Water 26 flow path from Waste Water Input Port 64G into Filter Chambers 72. Manifold Plate 64M, Head Plate 64 and Filter Plates 62 are also constructed to form a plurality of axial Discharge Passages 74 that are circumferential to and connected from Filter Chambers 72 to form a Crystal Clear Water 42 flow path from Filter Chambers 72 to corresponding Crystal Clear Water Discharge Ports 64C. Although not shown in detail, it should be noted that as indicated in FIG. 2 Crystal Clear Water Discharge Ports 64C are connected together at the four corner points outside of Manifold Plate 64M to form a single line to Crystal Clear Water Storage Tank 48, and Input Passage 70 and Discharge Passages 74 terminate at Tail Plate 62T.

Figure 3A:
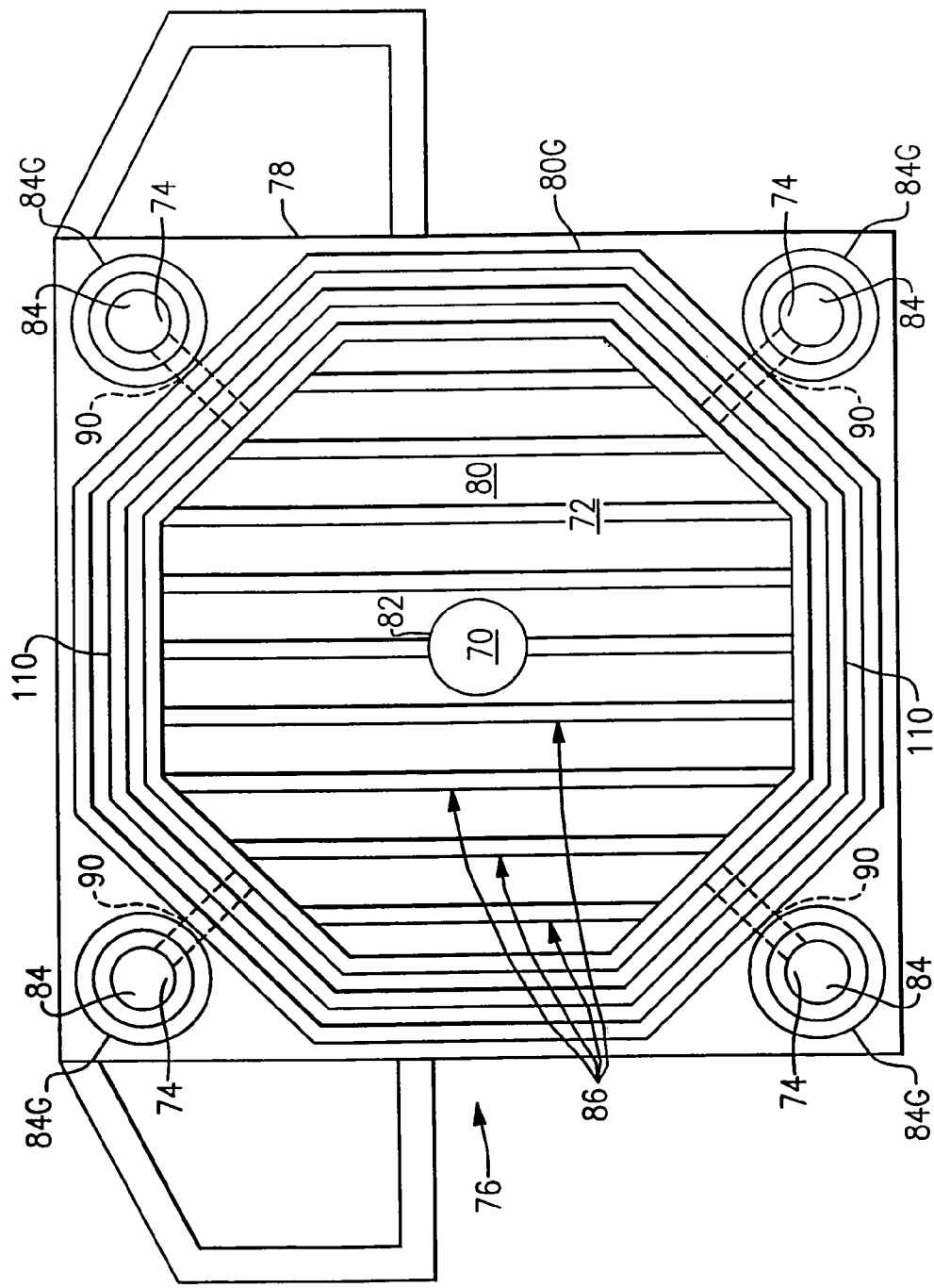
FIG. 3A is a diagrammatic end view of a typical filter plate of the high pressure filter, which also illustrates an end plate and a head plate of the high pressure filter.
Figure 3B:
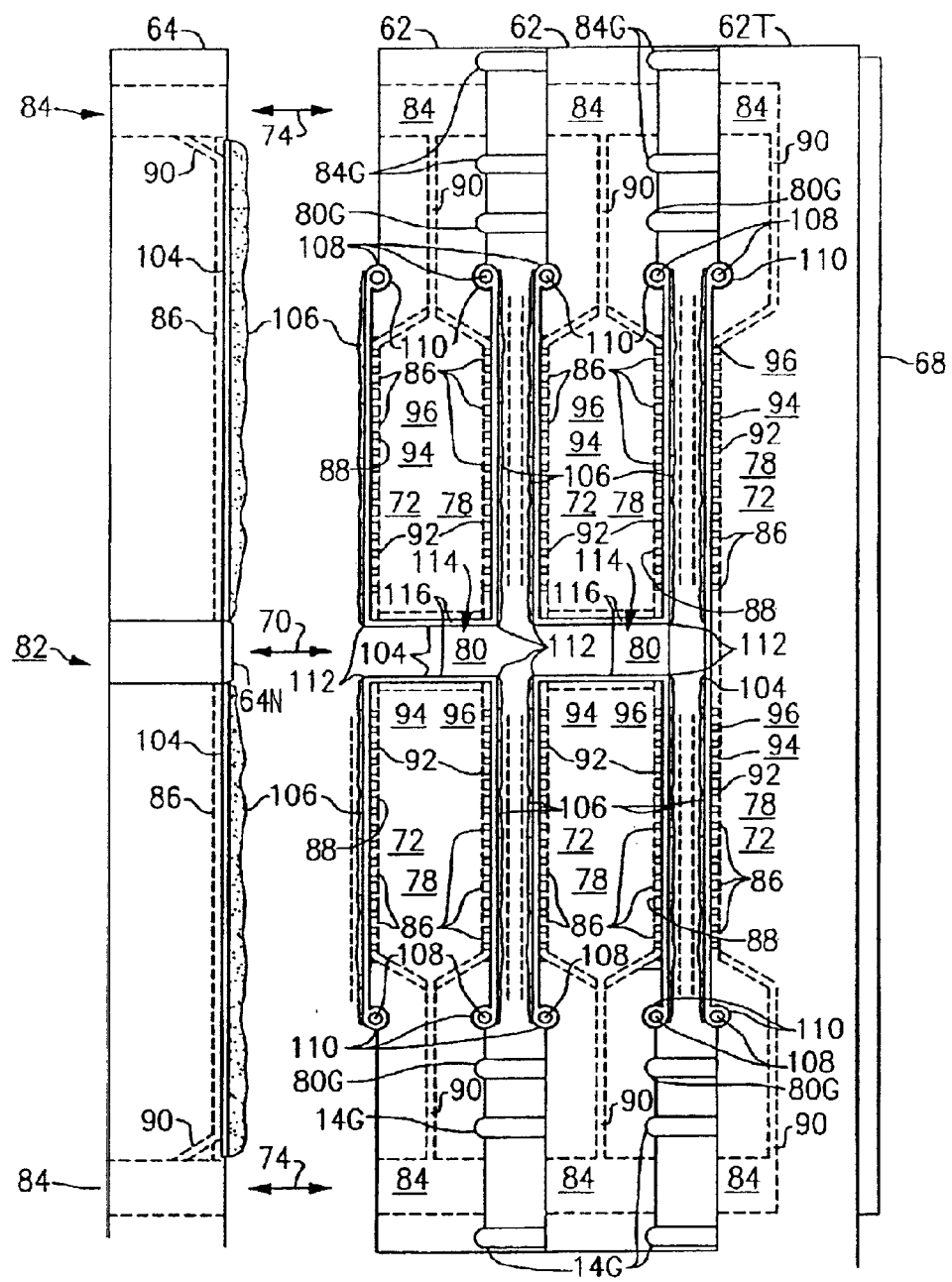
FIG. 3B is a cross section view of a filter stack of a high pressure filter, including a head plate, filter plates and a tail plate.
Figure 3C:
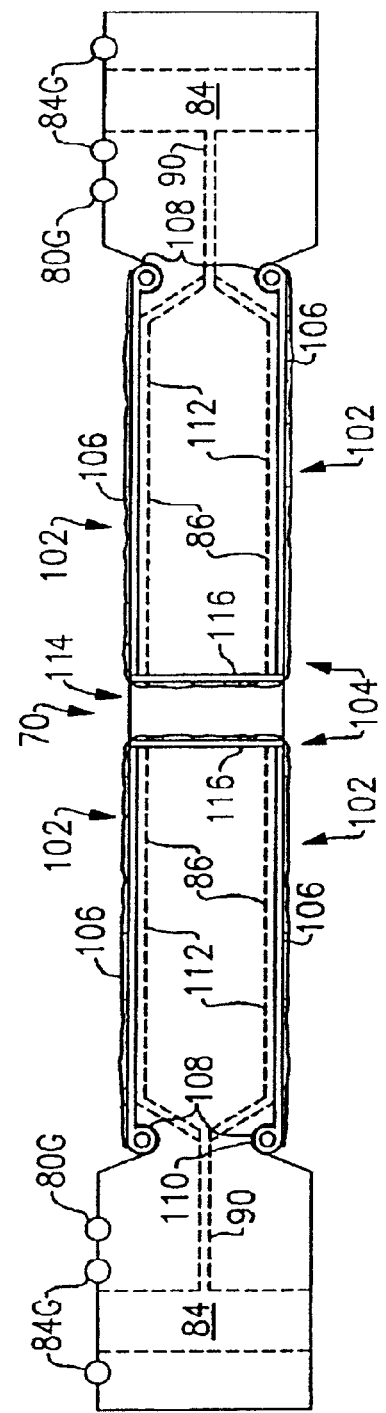
FIG. 3C is a cross section of the active filter elements of a high pressure filter for a filter plate having back-to-back filter chambers.

Referring to FIGS. 3A, 3B and 3C, FIG. 3A is a diagrammatic end view of a typical Filter Plate 62, which also illustrates a Head Plate 64 and a Tail Plate 62T, while FIG. 3B is a cross section view of a Filter Stack 60 including a Head Plate 64, Filter Plates 62 and a Tail Plate 62T. FIG. 3C, in turn, is a diagrammatic cross sectional view of Active Filter Elements 102, including a Filter Diaphragm 104 and a Granular Filter Aid Layer 106 for a Filter Plate 62 having back-to-back Filter Chambers 72.

As illustrated in FIG. 3A, therein is shown one Face 76 of a typical Filter Plate 62, which will also be used to illustrate a Head Plate 64 and a Tail Plate 62T. As shown in FIG. 3A, a Filter Plate 62, a Head Plate 64 and an Tail Plate 62T are each comprised of a Plate Body Filter Recess 80 and a Filter Plate 62 has a Filter Recess 80 formed in the central region of each Face 76 face of Plate Body 78. Head Plate 64 and Tail Plate 62T, however, have a Filter Recess 80 in only the Face 76 mating with an adjacent Filter Plate 62, that is, on the Face 76 facing into the Filter Stack 60.

As will be described further below, each Filter Recess 80 forms a Filter Chamber 72 supporting and containing Active Filter Elements 102, as will be described in detail in the following. When a Filter Plate 62 is mated with another Filter Plate 62, therefore, the facing Filter Recesses 80 form back-to-back Filter Chambers 72 having a common input flow path from Input Passage 70 and common output flow paths to Discharge Passages 74. A Filter Plate 62 mated with a Head Plate 64 will have a single Filter Chamber 72, as will Tail Plate 62T as in most embodiments only the Filter Plates 62 will include a double sided Filter Recess 80.

It is necessary to isolate Discharge Passages 74 and the Crystal Clear Water 42 therein from Input Passage 70 and the Waste Water 26 therein and to thereby force Waste Water 26 to pass through the Active Filter Elements 102 to become Crystal Clear Water 42.

For this reason, one Face 76 of each Filter Plate 62 will include a Recess Gasket 80G surrounding the Filter Recess 80 and Discharge Bore Gaskets 84G surrounding the sections of Discharge Passages 74 extending through the Filter Plate 62. Each Recess Gasket 80G and each Discharge Bore Gasket 84G seats against a mating Face 76 of a neighbor Filter Plate 62 or of Tail Plate 62T when Filter Plates 62, Head Plate 64 and Tail Plate 62T are forced together into a water and pressure tight Filter Stack 60.

Each Manifold Plate 64M and each Head Plate 64 will have a Recess Gasket 80G surrounding the single Filter Recess 80 and Discharge Bore Gaskets 84G surrounding the sections of Discharge Passages 74 extending through the Manifold Plate 64M or Head Plate 64 on the Faces 76 of these plates that face into the Filter Stack 60, that is, in the direction of Tail Plate 62T.

Each Face 76 of each Filter Plate 62, Head Plate 64 and Tail Plate 62T having a Filter Recess 80 will also have a Gasket Groove 110 surrounding the Filter Recess 80 in that Face 76 for receiving and securing the Active Filter Elements 102 contained in each Filter Recess 80, as will be discussed further below.

The section of Input Passage 70 formed in each Filter Plate 62, in Head Plate 64, in Tail Plate 62T and in Manifold Plate 64B is formed by an Input Bore 82 located centrally in the Filter Recesses 80 of the plates and the Input Bore 82 of Manifold Plate 64M, Head Plate 64, each Filter Plate 62 and Tail Plate 62T is aligned with the Input Bores 82 of other Filter Plates 62 and of Head Plate 64, Manifold Plate 64M and Tail Plate 62T to form Input Passage 70. In this regard, it must be noted that the Input Bore 82 in Tail Plate 62T does not extend through the Tail Plate 62T as the Input Passage 70 terminates at the Tail Plate 62T.

The sections of Discharge Passages 74 formed in Manifold Plate 64M, Head Plate 64, each Filter Plate 62, and Tail Plate 62T a corresponding plurality of Discharge Bores 84 located circumferentially around the Filter Recess 80 or Filter Recesses 80, and thus concentrically around Input Passage 70. The Discharge Bores 84 in Manifold Plate 64M, Head Plate 64, each Filter Plate 62 and Tail Plate 62T are each aligned with the corresponding Discharge Bores 84 of Manifold Plate 64M, Head Plate 64, other Filter Plates, 62, and Tail Plate 62T to form the corresponding Discharge Passages 74. In the case of an Tail Plate 62T, however, the Discharge Bores 84 do not extend through the Plate Body 78 as the Discharge Passages 74 terminate at the Tail Plate 62T.

As discussed in further detail below, the Active Filter Elements 102 of a Filter Stack 60 extend across and are supported in each Filter Recess 80 of each Filter Chamber 72 so that Waste Water 26 entering through Input Passage 70 flows through the Active Filter Elements 102 to become Crystal Clear Water 42 in Discharge Passages 74. For this reason, each Filter Recess 80, that is, each Filter Chamber 72, in Head Plate 64, in each Filter Plate 62 and in Tail Plate 62T is connected to Discharge Bores 84 through a plurality of Filter Discharge Grooves 86 formed in a Recess Face 88 of each Filter Recess 80 and Filter Discharge Passages 90 connecting the Filter Discharge Passages 86 with Discharge Bores 84. Filter Discharge Passages 86 and Filter Discharge Passages 90 thereby complete the flow path through which Waste Water 26 flows to and into Filter Chambers 72 through Input Passage 70 and Crystal Clear Water 42 flows from Filter Chambers 72 to and through Discharge Passages 74.

It must be noted with respect to Discharge Passages 74 and Filter Discharge Passage 86 that in a presently preferred embodiment of a Filter Stack 60 the sequence of Filter Plates 62 is formed of a sequence of alternating Filter Plates 62A and 62B arranged in the sequence: 62A, 62B, 62A, 62B . . . , and so on. In the presently preferred embodiment, Filter Plates 62A and Filter Plates 62B differ only in that in a Filter Plate 62A the Filter Discharge Passages 90 are connected to the upper and lower Discharge Passages 74 on one side of the Filter Plate 62 while in a Filter Plate 62B the Filter Discharge Passages 90 are connected to the upper and lower Discharge Passages 74 on the opposite side of the Filter Plate 62. As will be discussed further below, this arrangement of alternating connections between the Filter Recesses 80 and Discharge Passages 74 provides improved water flow characteristics and patterns through the Filter Stack 60 during normal filtering operation, during drying of the sludge that accumulates on Active Filter Elements 102, in back-flushing of the Filter Stack 60, and in coating Filter Media 104 coated with a Granular Filter Aid Layer 106, as discussed in further detail in a following discussion. It should be noted that in a plate having two Filter Recesses 80, such as a Filter Plate 62, the Filter Recesses 80 may share common Filter Discharge Passages 90.

It will be recognized and understood by those of ordinary skill in the arts that Filter Discharge Grooves 86 and Filter Discharge Passages 90 may be implemented in a number of alternate ways. For example, the Filter Discharge Grooves 86 of a Filter Chamber 72 may be replaced by a pattern of openings formed in a port plate set into the Filter Recess 80 and supporting the Active Filter Elements 102, thereby forming a space behind the port plate in which the water flowing through the Active Filter Elements 102 is collected before passing to Discharge Passages 84 through Filter Discharge Passages 90.

In another embodiment, and for example, a Filter Plate 62, Tail Plate 62T or Head Plate 64, or all three or any combination thereof, may be a box-like structure comprised of a frame generally forming the outside perimeter of the Filter Plate 62, Tail Plate 62T ro Head Plate 64 and two face plates. In this embodiment, Filter Discharge Grooves 86 would instead be formed by patterns holes in the face plates and the Input Bores 82 and Discharge Bores 84 would be formed by tubular members extending between the face plates, using blank face plates where necessary in the Head Plate 64 and Tail Plate 62T.

Next considering the Active Filter Elements 102 supported by and contained in the Filter Chambers 72, FIG. 3C is a diagrammatic cross sectional view of a Filter Stack 60, including a sequence of Filter Plates 62 forming a midsection portion of a Filter Stack 60, the input/output end section of the Filter Stack 60 including a Manifold Plate 64M, and the closed end section of the Filter Stack 60 including an Tail Plate 62T.

As described herein above, Filter Plates 62 mate face-to-face with other Filter Plates 62 or with a Head Plate 64 or an Tail Plate 62T so that their Input Bores 82 mate to form an Input Passage 70 and their Discharge Bores 84 mate to form Discharge Passages 74 with each Filter Recess 80 forming a Filter Chamber 72. As illustrated in FIG. 3C, each Filter Chamber 72 contains and supports Active Filter Elements 102 of a Filter Stack 60 wherein Active Filter Elements 102 rest upon Recess Face 78 and over Filter Discharge Grooves 86. As described, Active Filter Elements 102 are those elements of High Pressure Filter 46 that capture and filter out the particulate matter as necessary to convert Waste Water 26 into Crystal Clear Water 42 and, according to the present invention, Active Filter Elements 102 include a Filter Media 104 coated with a Granular Filter Aid Layer 106.

In the presently preferred embodiment, the Filter Media 104 for each Filter Chamber 72 is attached to a Face 76 of Head Plate 64, Filter Plate 62 or Tail Plate 62T around the periphery of the Filter Recess 80 by means of a Rope Gasket 108 stitched into the outer circumference of the Filter Media 104 and "force fit" seated into a Gasket Groove 110 in the Face 76 and extending around the periphery of the Filter Recess 80. Filter Media 104 thereby extends across the Filter Recess 80 over Filter Grooves 86 and is attached and sealed to the Face 76 around the Filter Recess 80. As indicated in FIG. 3A, the outer perimeter of Filter Media 104, and thus Rope Gasket 108 and Gasket Groove 110, are octagonal. It will be recognized, however, that the outer perimeter of Filter Media 104 and thus Rope Gasket 108 and Gasket Groove 110 may be of any desired shape, such as circular. It will also be recognized that Rope Gasket 108 may be formed in a number of ways, such as by being woven into the perimeter of Filter Media 104 rather than as an initially separate component stitched into or onto the Filter Mambrane 104. Rope Gasket 108 may also be made of any material that has a mass adequate to secure the Filter Media 104 to the plate.

In the case of a Filter Plate 62 with two back-to-back Filter Chambers 72, Filter Media 104 is comprised of two back-to-back Media Plates 112, each forming the section of Filter Media 104 extending across one of the two Filter Recesses 80. As shown, Each Media Plate 112 has a circular Input Bore Opening 114 corresponding to the Input Bore 82 of the Filter Plate 62, and the two Media Plates 112 are connected between the Input Bore Openings 114 by a cylindrical Media Plate Connector 116, so that the Filter Discharge Grooves 86, Filter Discharge Passages 90 and Discharge Bores 84 of each Filter Chamber 72 are completely separated from the Input Passage 70 by the Filter Media 104.

In the case of an Tail Plate 62T or of a Head Plate 64 containing a Filter Chamber 72, there is only one Filter Chamber 72 and the Filter Media 104 is thereby comprised of a single Media Plate 112. In the case of a Tail Plate 62T neither an Input Bore Opening 114 or Media Plate Connector 116 is required as the Input Passage 70 and Discharge Passages 84 terminate at the Tail Plate 62T. In the case of a Head Plate 64, an Input Bore Opening 114 is required. As indicated in FIG. 3D, a hole is cut into the single Media Plate 112 and fitted over a Centering Nipple 64N where a lock nut secures the Media Plate 112 to the Head Plate 64.

In the presently preferred embodiment of the present invention, Filter Medias 104 are preferably comprised of a woven fabric material having an Oxford weave of multifilament yarn made of polypropylene fibers and having a specific weight of approximately 14 oz. per square yard, a thread count of approximately 75×2 per square inch, and a sfm rating of approximately 2–3. The presently preferred filter cloth is manufactured, or stitched, by C. Goodman & Co., Inc. of Paterson, N.J. as style number 42614, and is presently formed into Filter Medias 104 by C. Goodman & Co., Inc. The Filter Medias 104 may typically have diameters in the range of 1 to 6 feet, with the diameters of Filter Medias 104 and the number of Filter Plates 62 in the Filter Stack 60 being dependent on the desired flow volume of Crystal Clear Water 42.

Next referring to Granular Filter Aid Layers 106, the upstream side of each Filter Media 104, that is, the side of each Filter Media 104 towards Input Passage 70, is coated with a Granular Filter Aid Layer 106 comprised of a granular filter material capable of capturing the particulate waste matter present in Waste Water 26. Each Granular Filter Aid Layer 106 thereby performs two functions, one being to aid in the filtration of particulate matter from Waste Water 26, that is, to capture particulate waste matter to prevent the particulate waste matter from reaching the Filter Media 104 itself. The second function is to prevent the particulate waste matter from penetrating the surface of the Filter Media 104 and causing premature "fouling" of the Filter Media 104 that is either captured by the Granular Filter Aid Layer 106 itself or that is stopped from passing through the Filter Mambrane 104 by the Filter Media 104 itself. In this regard, it will be recognized that a primary function of each Filter Media 104 is to support the material of the Granular Filter Aid Layer 106 that coats the Filter Media 104.

Each Granular Filter Aid Layer 106 is comprised of a layer of granular, porous material comprised of amorphous alumina silicate of the form commonly referred to by the trade name "Perlite", which is obtained from the heat treatment expansion of extracts from perlite ore, and having a thickness of approximately 0.1 lbs of Perlite per square foot of Filter Media 104 area. In the present embodiment of Granular Filter Aid Layers 106, the material comprising Granular Filter Aid Layers 106 is comprised of "Perlite" product number H 700 available from Harborlite Corp., which is located in Lompoc, Calif., and which is a perlite products division of World Minerals Inc., which is located in Santa Barbara, Calif.

The material employed in Granular Filter Aid Layers 106 in the presently preferred embodiment of the present invention, that is, "Perlite" product number H 700 from Harborlite Corp., is referred to as Food Codex Grade whole filter aid powder and is comprised of the form of amorphous alimina silicate known by the tradename "Perlite". The material has a density of 11.0 pounds per cubic foot in the packaged form and a density of 13.2 pounds per cubic foot in the cake form, a median particle size of 35.6 microns, a median pore size of 18.1 microns, a specific gravity of 2.3 and a DARCY permeability of 1.24 and a 140 mesh screen retain factor of 8%.

In summary, therefore, Waste Water 26 enters a Filter Stack 60 through Input Passage 70, which is comprised of the Input Bore 82 segments in Head Plate 64 and in each Filter Plate 62 and which connects Filter Chambers 72 such that Waste Water 26 can readily flow through Input Passage 70 from Input Bore 82 of Head Plate 64 into each Filter Chamber 72 along the Input Passage 70 and to the termination of Input Passage 70 at Tail Plate 62T. In each Filter Chamber 72, the Waste Water 26 flows through the Granular Filter Aid Layer 106 and the Filter Media 104 of Active Filter Elements 102, and, as Crystal Clear Water 42, flows through Filter Discharge Grooves 86 and Filter Discharge Passages 90 and into Discharge Bores 84. As described, each Discharge Bore 84 is a segment of a Discharge Passage 74 and Crystal Clear Water 42 thereby flows through Discharge Passages 74 to and through Head Plate 64, where the flow of Crystal Clear Water 42 from the Discharge Passages 74 are combined into a single flow to Crystal Clear Water Storage Tank 48.

The filtering of Waste Water 26 into Crystal Clear Water 42 will result in the accumulation of particulate waste matter filtered from the Waste Water 26 in each of the Granular Filter Aid Layers 106 and a deposit of some particulate waste material on each Filter Media 104. The buildup of "sludge" in each Granular Filter Aid Layer Granular Filter Aid Layers 106 and on each Filter Media 104 will result in a gradually increasing backpressure in the Filter Stack 60 until the flow of Waste Water 26 into Filter Stack 60 and the flow rate of Crystal Clear Water 42 from Filter Stack 60 is reduced to a level below that which is desired. At this point it is necessary to clean the "sludge" from Filter Stack 60.

A Filter Stack 60 is cleaned by first forcing air into the Filter Stack 60 through one of the upper Discharge Passages 74 in the reverse direction of the normal flow, whereupon the air will flow into passages and chambers of the Filter Plates 62, Head Plaate 64 and Tail Plate 62T and will force water from the sludge deposit in Granular Filter Layers 106 and the Filter Media 104 and out the lower Discharge Passage 74 connected to the Filter Chamber 72, which is left open for this purpose. The forcing of water out of the sludge deposit in Granular Filter Layers 106 and Filter Medias 104 will transform the sludge from a watery mud into a dryer and more solid deposit that is more manageable than the original watery sludge, which would typically drop off the Filter Medias 104 as soon as the Filter Stack 60 is opened. The air is forced into one or both upper Discharge Passages 74 through an air connection fitting connecting to a selected Discharge Passage 74. In a presently preferred embodiment, however, the air fitting is connected into Manifold Plate 64M and through Manifold Plate 64M to one or more Discharge Passages 74 through an air fitting mounted on Manifold Plate 64M separate from Discharge Passages 74, The pressure exerted by Hydraulic Ram 66 on Push Plate 68 and thereby on Tail Plate 62T, Filter Plates 62, End Plate 64 and Manifold Plate 64M is then released so that Filter Plates 62 and Tail Plate 62T can be separated and removed by means of the Plate Handles 78H located on each side of each Plate Body 78. The Granular Filter Aid Layer 106, the granular material of which contains and is now a part of the sludge on each Filter Media 104, is then scraped off of each Filter Media 104 and the Filter Medias 104 are washed with a high pressure hose spray to remove the last of the sludge layer and any particulate waste matter caught in the fabric of the Filter Medias 104. This process is normally performed on Head Plate 64 "in place" as Head Plate 64 is typically permanently mounted onto Frame 58 adjacent to Manifold Plate 64M.

The Filter Plates 62 and Tail Plate 62T are then reassembled into the Filter Stack 60 and the pressure exerted by Hydraulic Ram 66 is restored to force the Tail Plate 62T and the Filter Plates 62 into contact with each other and with Head Plate 64 and Manifold Plate 64M to form the air and pressure tight Filter Stack 60. Crystal Clear Water 42 is then pumped from a Cleaning System Storage Tank 118 and through the Filter Stack 60 in the normal direction of flow from Input Passage 70 to Discharge Passages 74 until all residual particulate matter is washed from the Discharge Passages 74.

It will be apparent that, at this stage, and while the Filter Stack 60 is cleaned, reassembled and flushed, there are no Granular Filter Layers 106 coating the Filter Medias 104, and that the Granular Filter Layers 106 must be pre-coated onto the Filter Medias 104 before use of the Filter Stack 60.

The pre-coating of Granular Filter Layers 106 onto the Filter Medias 104 is accomplished by connecting the Cleaning System Storage Tank 118 of crystal clear water to Input Passage 70 through Air Pump 44, with the Discharge Passages 74 being returned back to Cleaning System Storage Tank 118. The volume of crystal clear water in Cleaning System Storage Tank 118 is dependent upon the capacity of the Filter Stack 60 and should be sufficient to fill the Filter Stack 60, to fill the piping between the Cleaning System Storage Tank 118 and Filter Stack 60, including the capacity of Air Pump 44, and an additional margin in Cleaning System Storage Tank 118. It should also be noted that Cleaning System Storage Tank 118 may be, for example, a barrel, tank or "pit".

The crystal clear water in Cleaning System Storage Tank 118 is then "charged" with a quantity of the material comprising the Granular Filter Layers 106, which will be used to pre-coat the Filter Media 104, with the volume of pre-coat material being dependent on the square footage of Filter Media 104 contained in Filter Stack 60. The mixture of crystal clear water and pre-coat material is then pumped into Input Passage 70 and crystal clear water will flow out of Discharge Passages 74 and back to Cleaning System Storage Tank 118 while the pre-coat material is filtered out of the water by each Filter Media 104, thereby forming the Granular Filter Aid Layer 106 on each Filter Media 104. This process may be repeated as necessary with successive charges of the pre-coat material being added to the water until the necessary thickness of Granular Filter Aid Layer 106 is deposited on each Filter Media 104, which as described is on the order of 0.1 lb of pre-coat material per each square foot of area of the Filter Media 104 in the Filter Stack 60. Water continues to "recirculate" through the Cleaning System Storage Tank 118 until all pre-coat material has been removed by being deposited on Filter Media 104, and the Filter Stack 60 will then be ready for use.

As described herein above, a typical implementation of a presently preferred embodiment of a High Pressure Filter will include one Tail Plate 62T, one Head Plate Plate 64 mounted rigidly to Frame 58, wherein Frame 58 includes Manifold Plate 64M mounted on Frame 58, several Filter Plates 62 which are mounted into Frame 58, and the Hydraulic Ram 66, which is attached between Frame 58 and Push Plate 68. Filter Plates 62 and Filter Medias 104 may be between 1 and 6 feet across and approximately 2 to 4 inches thick, while the single Input Passage 70 and Discharge Passages 74, of which there are typically 4, may range from 1 to 3 inches in diameter.

Next considering alternate embodiments and implementations of a Water Treatment And Recycling System 10 of the present invention, the stone fabrication industry may be regarded as comprised of two distinct and often separate but related fields, one which may be referred to as "interiors" or "detail" or "countertop" stone processing and the other of which may be referred to as "exterior" or "architectural" or "volume" stone processing. "Interiors" stone processing, which is addressed above is typically comprised of the fabrication, for example, of countertops for residential or commercial use, and is typically characterized a lower volume of stone processing but to a high degree of finish on the stone.

As described above with respect to a Water Treatment And Recycling System 10, "interior" stone processing typically requires both a relatively high volume of relatively low quality water for stone cutting and rough finishing processes and a supply of very high quality recycled water, typically with allowable particle sizes or 2 microns or less after filtration, for high quality stone processing operations, such as final polishing. A Water Treatment And Recycling System 10 as described herein above is intended to meet these requirements for "interior" stone processing operations.

"Exterior" or "architectural" stone processing, however, is typically characterized by a lower standard of finish on the stone but significantly higher volumes of stone being processed. "Architectural" stone processing may therefore require significantly higher volumes of water than "interior" stone processes, but typically does not require as high a quality of water as does "interior" stone processing because the desired or required standard of final finish is lower than is required in "interior" stone processing. For example, filtration to particle sizes of 75 microns and below is typically acceptable, although certain processes may require polishing to the "crystal clear" level, as described above, as well.

Stated another way, the "grey" water produced by the above described Water Treatment And Recycling System 10 is typically of acceptable quality for the rough cutting and rough shaping and finishing processes of "exterior" or "architectural" stone processing. The finer shaping and finish steps in "exterior" or "architectural" stone processing, however, require water of a quality that, while not as high as the clear water standard for "interior" stone processing, is higher than the grey water standard for interior stone processing and will be referred to hereinafter as "filtered grey water". It will also be understood that, as described herein above, certain processes must meet the "crystal clear" standard, as well. The "filtered grey water" requirements, however, may be met by an appropriate adaptation of a Water Treatment And Recycling System 10.

Figure 4:
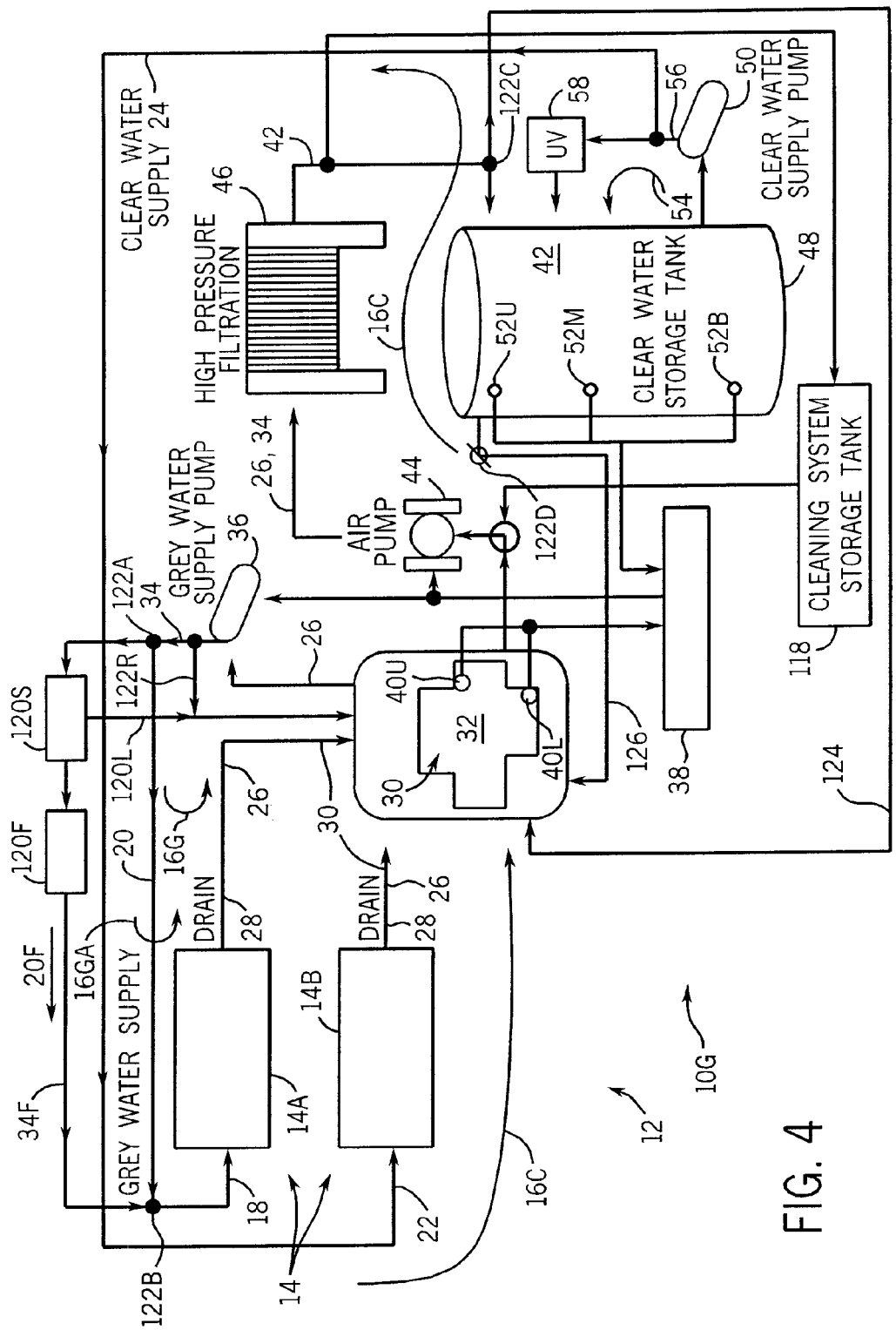
FIG. 4 is a diagrammatic representation of an alternate embodiment of a water processing system of the present invention for filtering waste water into recycled grey water for exterior or architectural stone processing.

Referring now to FIG. 4, therein is illustrated a Water Treatment And Recycling System 10G of the present invention wherein a Water Treatment And Recycling System 10 of the present invention is adapted for the specific requirements of filtering waste water from Stone Processing Tools 14 into recycled grey water for high volume exterior and architectural stone processing. As will be described in further detail in the following, a Water Treatment And Recycling System 10G is required to provide an adequate flow of Filtered Grey Water 34F to Stone Processing Tools 14A, wherein Filtered Grey Water 34F may be defined as water containing particulate matter of no greater than 75 microns, and to maintain an adequate reserve supply of Grey Water 34, including removing excess or oversized particulate matter.

It must also be noted that it may be necessary or desirable for a Water Treatment And Recycling System 10G to be capable of providing adequate flows of Clear Water 42 for "interior" stone processing, as described herein above with respect to a Water Treatment And Recycling System 10. In this instance, the system will be capable of operating as a water filtration system for either or both an "exterior" or "architecture" stone processing system and an "interior" stone processing system, either alternately or concurrently.

As may be seen in FIG. 4, the resulting Water Treatment And Recycling System 10G will include an Filtered Grey Water Loop 16GA that, in effect, parallels the Grey Water Supply Line 20 of a Water Treatment And Recycling System 10 as illustrated in FIG. 1 and that thereby shares part of Grey Water Loop 16G but includes a Filtered Grey Water Path 20F. As shown, Filtered Grey Water Path 20F is connected between the output of Grey Water Supply Pump 36 and Grey Water Intakes 18 of Stone Processing Tools 14A and typically includes a Separation Filter 120S. In a filtered grey water system of the present invention, Separation Filter 120S employs mechanical separation technology, such as a centrifugal style separator available from, for example, Lakos Systems and removes larger particles, that is, particles down to the 75 micron size, from Waste Water 26 drawn from Waste Water Collection Tank 32. As shown, Separation Filter 120S has a Large Particle Output 120L discharging water containing the separated larger particles to Waste Water Collection Tank 32 to be removed from the Waste Water 26 therein by other filtration processes, described below.

The grey water output of Separation Filter 120S may be passed though a Particle Filter 120F for removal of remaining particles to whatever size is deemed necessary for Stone Processing Tools 14A, wherein Separation Filter 120S may be, for example, a filter available from Rosedale Products. It should be noted, however, that the filtration processes of Filtered Grey Water Path 20F may be implemented through other filter processes, such as through the recycling loop through High Pressure Filter 46 as described below. In these embodiments, the system would include a Recycling Path 122R from the outlet of Gray Water Supply Pump 36 and back to Waste Water Collection Tank 32, thereby providing a significant flow of Waste Water 26 from and back into Waste Water Collection Tank 32. This flow will thereby keep the solid waste particles in Waste Water 26 in Waste Water Collection Tank 32 in suspension for removal through the alternate filter path, such as the filter path through High Pressure Filter 46 as described below.

As indicated generally in FIG. 4, Filtered Grey Water Path 20F may be connected into the system in place of Grey Water Supply Line 20, thereby comprising the only grey water flow path from Grey Water Supply Pump 36 to Stone Processing Tools 14A. This would be the typical configuration used, for example, in a Water Treatment System 10G that was intended for only "exterior" or "architectural" stone processing. Filtered Grey Water Path 20F may be connected in parallel with Grey Water Supply Line 20 by means of, for example, Valves 122A and 122B, whereupon the water filtration system may selectively operate as either or both of Water Treatment System 10G and a Water Treatment System 10. In other embodiments, however, such as when the systems is required to also provide "crystal clear" water, the Clear Water Supply Loop 16C would also be provided, as described herein above. It should also be noted that the filtration.

As described above, it is necessary or at least preferable that the Water Treatment System 10G remove at least the larger particulate waste in the Waste Water 26 in Waste Water Collection Tank 32 to provide a suitable and adequate reserve of Grey Water 34 for Filtered Grey Water Path 20F and Stone Processing Tools 14A. It will be apparent that Separation Filter 120S alone is inadequate for this task as it returns the larger particulate waste to Waste Water Collection Tank 32, so that the Waste Water 26 in Waste Water Collection Tank 32 would simply accumulate larger and larger quantities of particulate waste.

In a presently preferred embodiment of a Water Treatment System 10G, therefore, the filtration path through High Pressure Filter 46, which is described in detail herein above, is employed to recycle Waste Water 26 from Waste Water Collection Tank 32 through a Clear Water Return Path 124 that includes the path from Waste Water Collection Tank 32, through High Pressure Filter 46 and back to Waste Water Collection Tank 32. This path thereby continuously recycles and filters the Waste Water 26 in Waste Water Collection Tank 32 to reduce or at least maintain the level of particulate matter therein. As shown in FIG. 4, in this application the return path from High Pressure Filter 46 does not return to Clear Water Storage Tank 42, but instead bypasses Clear Water Storage Tank 42 and returns directly to Waste Water Collection Tank 32. As in the case of Filtered Grey Water Path 20F, a Valve 122C may be employed at the branching of the clear water output path from High Pressure Filter 46, thereby allowing the clear water from High Pressure Filter 46 to be directed to either Clear Water Storage Tank 42 or Waste Water Collection Tank 32, depending upon system demands and whether the system is being operated as either or both of Water Treatment System 10G and a Water Treatment System 10.

Lastly, a Water Treatment System 10G may further include a Clear Water Overflow path 126 running from an overflow level of Clear Water Storage Tank 42 and to Waste Water Collection Tank 32 and controlled through a Valve 122D, thereby avoiding the overflow waste of clean water and allowing continuous operation of the system during the startup phases of operation.

Finally, it should be noted that a Filtered Grey Water Path 20F with either or both of a Separation Filter 120S and a Particle Filter 120F may be employed in a Water Treatment System 10 in place of the Grey Water Supply Line 20 to provide a higher level of filtration for the water provided to Stone Processing Tools 14A, if so desired.

Since certain changes may be made in the above described method and system without departing from the spirit and scope of the invention herein involved, it is intended that all of the subject matter of the above description or shown in the accompanying drawings shall be interpreted merely as examples illustrating the inventive concept herein and shall not be construed as limiting the invention.

What is claimed is:

1. A water treatment and recycling system for providing at least one of filtered grey water and filtered grey water and clear water to a stone processing system respectively including at least one of grey water stone fabrication equipment and filtered grey water and clear water stone fabrication equipments, comprising:
    a waste water storage tank connected from the waste water discharge ports of the grey water equipment for receiving and storing the waste water,
    a filtered grey water supply loop, including
        a grey water pump connected from the waste water storage tank for pumping waste water from the waste water storage tank as grey water, and
        a filtered grey water filter path connected from a grey water output of the grey water pump and having a separation filter for removing large particulate waste from the grey water, the separation filter having a filtered grey water output connected to an input port of a filtered grey water tool and discharging the large particulate waste into the waste water storage tank, and
    a clear water filter loop, including
        an air pump for pumping waste water from the waste water storage tank, and
        a high pressure filter for reducing particulate matter in the waste water storage tank by filtering particulate matter from the waste water to convert the waste water into the clear water, the high pressure filter being connected from the air pump and having a clear water output discharging into the waste water storage tank.

2. The water treatment and recycling system of claim 1, wherein the grey water filter path further comprises:
    a particle filter for filtering smaller particulate matter from the filtered grey water.

3. The water treatment and recycling system of claim 1, wherein:
    a waste water discharge port of the clear water equipment is connected to discharge the waste water from the clear water equipment into the waste water storage tank, and further including
    a clear water storage tank selectably connected from the high pressure filter for receiving and storing the clear water from the high pressure filter, and
    a clear water supply path including a clear water pump connected from the clear water storage tank for pumping clear water from the clear water storage tank and to an input port of a clear water tool.

4. The water treatment and recycling system of claim 1 wherein the high pressure filter comprises:
    a frame holding a filter stack including a head plate, a plurality of filter plates, a tail plate and a ram for applying axial pressure along the filter stack to force the head plate, the filter plates and the tail plate into a pressure tight assembly,
    the head plate and each of the filter plates including
        an axial input bore connecting sequentially along the filter stage to form an axial input passage for receiving waste water from the waste water storage tank, and
        a plurality of discharge bores located circumferentially around the axial input passage to form a corresponding plurality of discharge passages extending along the length of the filter stack, the discharge passages being connected to one another outside of the head plate and to the crystal clear water storage tank, and
    each of the filter plates further including
        at least one filter chamber for containing and supporting active filter elements, each filter chamber being connected between the axial input passage and each of the plurality of discharge passages and the active filter elements removing particulate matter from the waste water flowing along the input passage to provide the crystal clear water discharged through the discharge passages, and
    the tail plate being located at the opposite end of the filter stack from the head plate and terminating the input passage and the discharge passages.

5. The water treatment and recycling system of claim 4, wherein the active filter elements comprise:
    a filter media extending across a filter chamber in a flow path between the input passage and the discharge passages communicating with the filter chamber, and
    a granular filter layer coated upon and supported by the filter Media for removal of particulate matter from the waste water, the granular filter layer being located in the flow path from the input passage to the discharge passages on the input passage side of the filter media.

6. The water treatment and recycling system of claim 4, further comprising:
in each filter plate,
a filter chamber gasket circumferentially surrounding at least one filter chamber to seal the at least one filter chamber to a next sequential one of a filter plate, the head plate and the tail plate, and
a discharge bore gasket circumferentially surrounding each discharge bore on one face of the filter plate to seal each discharge bore to a next sequential one of a filter plate, the head plate and the tail plate.

7. A method for providing at least one of filtered grey water and filtered grey water and clear water to a stone processing system respectively including at least one of grey water stone fabrication equipment and grey water and clear water stone fabrication equipments, comprising the steps of:
receiving waste water from the waste water discharge ports of the grey water equipment and storing the waste water in a waste water storage tank,
pumping waste water from the waste water storage tank as grey water,
removing large particulate waste from the grey water to convert the grey water into filtered grey water by filtering the grey water in a separation filter, and
discharging the large particulate waste into the waste water storage tank, and
providing the filtered grey water to an input port of a grey water tool,
filtering particulate matter from the waste water in the waste water storage tank by filtering the waste water through a high pressure filter to convert the waste water to clear water, and
discharging the clear water into the waste water storage tank.

8. The method for providing at least one of filtered grey water and filtered grey water and clear water to a stone processing system of claim 7, further comprising the step of:
filtering particulate matter from the filtered grey water from the separation filter to remove smaller particulate matter by filtering the filtered grey water through a particle filter.

9. The method for providing at least one of filtered grey water and filtered grey water and clear water to a stone processing system of claim 7, further comprising the steps of:
receiving and storing at least a portion of the clear water from the high pressure filter in a clear water storage tank, and
pumping clear water from the clear water storage tank and through a clear water path to a clear water tool, and
discharging the waste water from the clear water equipment into the waste water storage tank.

10. The water treatment and recycling system of claim 7 wherein the high pressure filter comprises:
a frame holding a filter stack including a head plate, a plurality of filter plates, an tail plate and a ram for applying axial pressure along the filter stack to force the head plate, the filter plates and the tail plate into a pressure tight assembly,
the head plate and each of the filter plates including
an axial input bore connecting sequentially along the filter stage to form an axial input passage for receiving waste water from the waste water storage tank, and
a plurality of discharge bores located circumferentially around the axial input passage to form a corresponding plurality of discharge passages extending along the length of the filter stack, the discharge passages being connected to one another outside of the head plate and to the crystal clear water storage tank, and
each of the filter plates further including
at least one filter chamber for containing and supporting active filter elements, each filter chamber being connected between the axial input passage and each of the plurality of discharge passages and the active filter elements removing particulate matter from the waste water flowing along the input passage to provide the crystal clear water discharged through the discharge passages, and
the tail plate being located at the opposite end of the filter stack from the head plate and terminating the input passage and the discharge passages.

11. The water treatment and recycling system of claim 10, wherein the active filter elements comprise:
a filter media extending across a filter chamber in a flow path between the input passage and the discharge passages communicating with the filter chamber, and
a granular filter layer coated upon and supported by the filter Media for removal of particulate matter from the waste water, the granular filter layer being located in the flow path from the input passage to the discharge passages on the input passage side of the filter media.

12. The water treatment and recycling system of claim 10, wherein each filter plate includes:
a filter chamber gasket circumferentially surrounding at least one filter chamber to seal the at least one filter chamber to a next sequential one of a filter plate, the head plate and the tail plate, and
a discharge bore gasket circumferentially surrounding each discharge bore on one face of the filter plate to seal each discharge bore to a next sequential one of a filter plate, the head plate and the tail plate.

13. A method for recycling waste water from a stone processing system by removing particulate matter from the waste water, comprising the steps of:
receiving and storing waste water from the stone processing system in a waste water storage tank,
pumping waste water from the waste water storage tank as grey water,
removing large particulate waste from the grey water to convert the grey water into filtered grey water by filtering the grey water in a separation filter, and
discharging the large particulate waste into the waste water storage tank, and
providing the filtered grey water to the stone processing system, while filtering particulate matter from the waste water in the waste water storage tank by
filtering the waste water from the waste water storage tank to clear water by filtering the waste water in the high pressure filter, and
discharging the clear water into the waste water storage tank, wherein
the high pressure filter includes a filter stack including a head plate, a plurality of filter plates and a tail plate, wherein
the head plate and each of the filter plates include
an axial input bore connecting sequentially along the filter stage to form an axial input passage for receiving waste water from the waste water storage tank, and a plurality of discharge bores located circumferentially around the axial input passage to form a corresponding plurality of discharge passages extending along the length of the filter stack, the discharge passages being connected to one another outside of the head plate and to the crystal clear water storage tank, and the tail plate is located at the opposite end of the filter stack from the head plate and terminating the input passage and the discharge passages.

14. The method of claim 13, wherein the filter plates comprise:

a filter media extending across a filter chamber in a flow path between the input passage and the discharge passages communicating with the filter chamber, and a granular filter layer coated upon and supported by the filter Media for removal of particulate matter from the waste water, the granular filter layer being located in the flow path from the input passage to the discharge passages on the input passage side of the filter media.

15. The method of claim 13, wherein:

each filter plate includes, a filter chamber gasket circumferentially surrounding at least one filter chamber to seal the at least one filter chamber to a next sequential one of a filter plate, the head plate and the tail plate, and a discharge bore gasket circumferentially surrounding each discharge bore on one face of the filter plate to seal each discharge bore to a next sequential one of a filter plate, the head plate and the tail plate.

16. The method of claim 13, further including a method for cleaning the filter stack of accumulated waste particulate matter, comprising the steps of:

forcing air into the filter stack through a discharge passage to force air to flow through the filter chambers and the active filter elements to and through the input passage to force water from particulate waste matter captured by the active filter elements, releasing axial pressure on the filter stack to permit separation of the head plate, the filter plates and the tail plate, scraping the particulate waste matter captured by the active filter elements and a granular filter layer containing the captured particulate waste matter from the surface of a filter media, flushing captured particulate waste matter from the surface of the filter Media by means of a high pressure water system, reassembling the head plate, the filter plates and the tail plate into a filter stack and restoring the axial pressure on the head plate, the filter plates and the tail plate to force the filter stack into a pressure tight assembly, flushing crystal clear water through the filter stack in the normal direction of flow to fill the high pressure filter and to flush residual waste matter from the filter stack by forcing crystal clear water into the input passage to flow through the filter plates and out the discharge passage, and restoring the granular filter layer coating to each filter media.

17. The method of claim 16 further including a method for coating a granular filter layer onto each filter media, comprising the steps of:

pumping a mixture of crystal clear water and a granular material comprising the granular filter layer into the input passage of the filter stack to flow through each filter Media of each filter plate and through the discharge passages from the filter stack, and recirculating the crystal clear water returned from the discharge passages of the filter stack and replenishing the granular material mixed into the crystal clear water until a desired thickness of the granular material is deposited on the each filter Media of each filter plate.

18. The method of claim 13 wherein each filter plate includes a filter media coated with a granular filer layer for filtering the particulate waste matter from the waste water to convert the waste water into crystal clear water, further comprising a method for depositing a granular filter layer on each filter media, comprising the steps of:

pumping a mixture of crystal clear water and a granular material comprising the granular filter layer into the input passage of the filter stack to flow through each filter media of each filter plate and through the discharge passages from the filter stack, and recirculating the crystal clear water returned from the discharge passages of the filter stack and replenishing the granular material mixed into the crystal clear water until a desired thickness of the granular material is deposited on the each filter Media of each filter plate.

19. A water treatment and recycling system for providing at least one of filtered grey water and filtered grey water and clear water to a stone processing system respectively including at least one of grey water stone fabrication equipment and filtered grey water and clear water stone fabrication equipments, comprising:

a waste water storage tank connected from the waste water discharge ports of the grey water equipment for receiving and storing the waste water, a filtered grey water supply loop, including a grey water pump connected from the waste water storage tank for pumping waste water from the waste water storage tank as grey water, and a filtered grey water filter path connected from a grey water output of the grey water pump and to an input port of a filtered grey water tool and having a grey water recycling discharge path into the waste water storage tank to maintain particulate matter in suspension in the waste water in the waste water collection tank, and a clear water filter loop, including a filter pump for pumping waste water from the waste water storage tank, and a high pressure filter for reducing particulate matter in the waste water storage tank by filtering particulate matter from the waste water to convert the waste water into the clear water, the high pressure filter being connected from the filter pump and having a clear water output discharging into the waste water storage tank.

* * * * *

UNITED STATES PATENT AND TRADEMARK OFFICE
CERTIFICATE OF CORRECTION

PATENT NO. : 7,244,366 B2
APPLICATION NO. : 11/098215
DATED : July 17, 2007
INVENTOR(S) : Ross E. Perry et al.

It is certified that error appears in the above-identified patent and that said Letters Patent is hereby corrected as shown below:

On the Title Page Item (54)
Title:
"Water Filtration and Recycling For Stone Fabrication Equipment For Exterior And Architectural Stone" should be
--Water Filtration and Recycling For Stone Fabrication Equipment--

Column 1, Field Of The Invention, Line 8:
"siteseptic" should be
--site septic--

Column 2, Line 33:
"effect" should be
--affect--

Column 2, Line 45:
"diameter," should be
--size,--

Column 3, Line 1-2:
"equipments" should be
--equipment--

Column 3, Line 13:
"gray" should be
--grey--

Column 3, Line 42:
"an" should be
--a--

Column 4, Line 2:
"for" should be
--to aid in--

Column 4, Line 29:
"an end" should be
--a tail--

UNITED STATES PATENT AND TRADEMARK OFFICE
CERTIFICATE OF CORRECTION

PATENT NO. : 7,244,366 B2
APPLICATION NO. : 11/098215
DATED : July 17, 2007
INVENTOR(S) : Ross E. Perry et al.

It is certified that error appears in the above-identified patent and that said Letters Patent is hereby corrected as shown below:

Column 4, Line 40:
ADD after "processing"
--or in combination with the present invention to include all stone processing products or operations.--

Column 4, Lines 58, 59, 61:
"diameter" should all be
--size--

Column 5, Line 19:
DELETE ",if necessary"

Column 5, Lines 39, 43, 54:
"40" should all be
--40U--

Column 5, Line 62:
"to allow" should be
--to the bypass line on Grey Water Pump 36 to allow--

Column 5, Line 62:
"sediments" should be
--sediment--

Column 6, Line 13:
"diameter" should be
--size--

Column 6, Line 45:
DELETE "40U and"

Column 6, Line 51:
DELETE "and 40L"

Column 6, Line 52 and 53:
DELETE "which may be the case when, for example, Waste Water Collection Tank 32 is a pit,"

Column 6, Line 54:
DELETE "and 40L"

UNITED STATES PATENT AND TRADEMARK OFFICE
CERTIFICATE OF CORRECTION

PATENT NO. : 7,244,366 B2
APPLICATION NO. : 11/098215
DATED : July 17, 2007
INVENTOR(S) : Ross E. Perry et al.

It is certified that error appears in the above-identified patent and that said Letters Patent is hereby corrected as shown below:

Column 6, Line 55:
After "Pump 36" ADD --and Waste Water Float Sensor-Switches 40L will control only air diaphragm pump 44.--

Column 7, Line 37:
"52" should be
--52M--

Column 8, Line 60:
"Diaphragm" should be
--Media--

Column 8, Line 66:
"an" should be
--a--

Column 9, Line 28:
ADD after "62T" --or head plate 64--

Column 9, Line 31:
DELETE "Manifold Plate 64M and each"

Column 9, Line 45:
DELETE "in Tail Plate 62T"

Column 9, Line 48:
after "64", ADD --and--

Column 9, Line 49-50:
DELETE "and Tail Plate 62T"

Column 9, Line 52:
DELETE "in Tail Plate 62T"

Column 9, Line 56:
after "64", ADD --and--

Column 9, Line 56 and 57:
DELETE "and Tail Plate 62T"
ADD --form-- before "a corresponding plurality..."

UNITED STATES PATENT AND TRADEMARK OFFICE
CERTIFICATE OF CORRECTION

PATENT NO. : 7,244,366 B2
APPLICATION NO. : 11/098215
DATED : July 17, 2007
INVENTOR(S) : Ross E. Perry et al.

It is certified that error appears in the above-identified patent and that said Letters Patent is hereby corrected as shown below:

Column 9, Line 61:
after "64", ADD --and--
DELETE after Plate 62 "and Tail Plate 62T"

Column 9, Line 63:
after "64", ADD --and--

Column 9, Line 64:
DELETE "and Tail Plate 62T"

Column 9, Line 65:
"an" should be
--a--

Column 10, Line 37:
DELETE "in back-flushing of the Filter Stack 60,"

Column 10, Line 44:
"arts" should be
--art--

Column 10, Line 48:
"port" should be
--face--
"set" should be
--76--

Column 10, Line 50:
"port" should be
--face--
ADD --76-- after the word "plate"

Column 10, Line 58:
"ro" should be
--or--
ADD after the word "two" --blank outside--

UNITED STATES PATENT AND TRADEMARK OFFICE
CERTIFICATE OF CORRECTION

PATENT NO. : 7,244,366 B2
APPLICATION NO. : 11/098215
DATED : July 17, 2007
INVENTOR(S) : Ross E. Perry et al.

It is certified that error appears in the above-identified patent and that said Letters Patent is hereby corrected as shown below:

Column 10, Line 60:
"patterns" should be
--pattern--
ADD after the word "plates" --76--

Column 10, Line 63:
ADD after the word "blank" --outside--

Column 11, Line 5:
"an" should be
--a--

Column 11, Line 8:
"an" should be
--a--

Column 11, Line 11:
"FIG. 3C" should be
--FIGS. 3A, 3B, and 3C--

Column 11, Line 40-41:
"Manbrane" should be
--Media--

Column 11, Line 48:
"Each" should be
--each--

Column 11, Line 57:
"an" should be
--a--

Column 11, Line 65:
"3D" should be
--3B--

Column 11, Line 67:
INSERT --, for example,-- before "secures"

UNITED STATES PATENT AND TRADEMARK OFFICE
CERTIFICATE OF CORRECTION

PATENT NO. : 7,244,366 B2
APPLICATION NO. : 11/098215
DATED : July 17, 2007
INVENTOR(S) : Ross E. Perry et al.

It is certified that error appears in the above-identified patent and that said Letters Patent is hereby corrected as shown below:

Column 12, Line 7:
"sfm" should be
--scfm or--

Column 12, Line 11:
ADD after "Inc." --or the like.--

Column 12, Line 28:
"104" should be
--104.--

Column 12, Line 29:
DELETE "that"
REPLACE with --The particulate waste--

Column 12, Line 29:
DELETE "itself"

Column 12, Line 30:
DELETE "that is"
"Mambrane" should be
--Media--

Column 12, Line 53:
"tradename" should be
--trade name--

Column 13, Line 28:
"Plaate" should be
--Plate--

Column 13, Line 42:
"or more" should be
--upper--

Column 13, Line 43:
"Passages" should be
--Passage--

UNITED STATES PATENT AND TRADEMARK OFFICE
CERTIFICATE OF CORRECTION

| | |
|---|---|
| PATENT NO. | : 7,244,366 B2 |
| APPLICATION NO. | : 11/098215 |
| DATED | : July 17, 2007 |
| INVENTOR(S) | : Ross E. Perry et al. |

It is certified that error appears in the above-identified patent and that said Letters Patent is hereby corrected as shown below:

Column 13, Line 44:
"," should be
--.--

Column 13, Line 65:
ADD --water-- before the word "pressure"

Column 14, Line 1:
after "until" ADD --filter stack 60 is filled with crystal clear water and--

Column 14, Line 11:
"of" should be
--filled with--

Column 14, Line 12:
after "the" ADD --upper--

Column 14, Line 13:
after "being" ADD --open (the lower closed) and--

Column 14, Line 48:
DELETE the second word "Plate"

Column 14, Line 56:
after "4" ADD --(2 upper and 2 lower),--

Column 15, Line 1:
after "characterized" ADD --by--

Column 16, Line 22:
"Separation" should be
--Particulate--
"120S" should be
--120F--

Column 16, Line 25:
in front of "Filtered" ADD --grey water supply line 20 may be preferred to--

UNITED STATES PATENT AND TRADEMARK OFFICE
CERTIFICATE OF CORRECTION

PATENT NO.      : 7,244,366 B2
APPLICATION NO. : 11/098215
DATED           : July 17, 2007
INVENTOR(S)     : Ross E. Perry et al.

It is certified that error appears in the above-identified patent and that said Letters Patent is hereby corrected as shown below:

Column 16, Lines 25, 26, 27:
DELETE "may be implemented through other filter processes, such as through the recycling loop through High Pressure Filter 46 as described below."

Column 16, Line 27:
"these" should be
--this--

Column 16, Line 28:
"embodiments" should be
--embodiment--

Column 16, Line 29:
"Gray" should be
--Grey--

Column 16, Line 32:
after "thereby" ADD --offer a pressure bypass outlet for pump 36 and at the same time prevent pump "dead-heading" to--

Column 16, Line 50:
"systems" should be
--system--

Column 16, Lines 52 and 53:
DELETE "It should also be noted that the filtration."

Column 16, Line 58:
"34" should be
--34F--

UNITED STATES PATENT AND TRADEMARK OFFICE
CERTIFICATE OF CORRECTION

PATENT NO. : 7,244,366 B2
APPLICATION NO. : 11/098215
DATED : July 17, 2007
INVENTOR(S) : Ross E. Perry et al.

It is certified that error appears in the above-identified patent and that said Letters Patent is hereby corrected as shown below:

Column 17, Line 25:
"avoiding" should be
--allowing--
DELETE "waste"

Signed and Sealed this

Thirteenth Day of November, 2007

JON W. DUDAS
*Director of the United States Patent and Trademark Office*